UNITED STATES PATENT OFFICE.

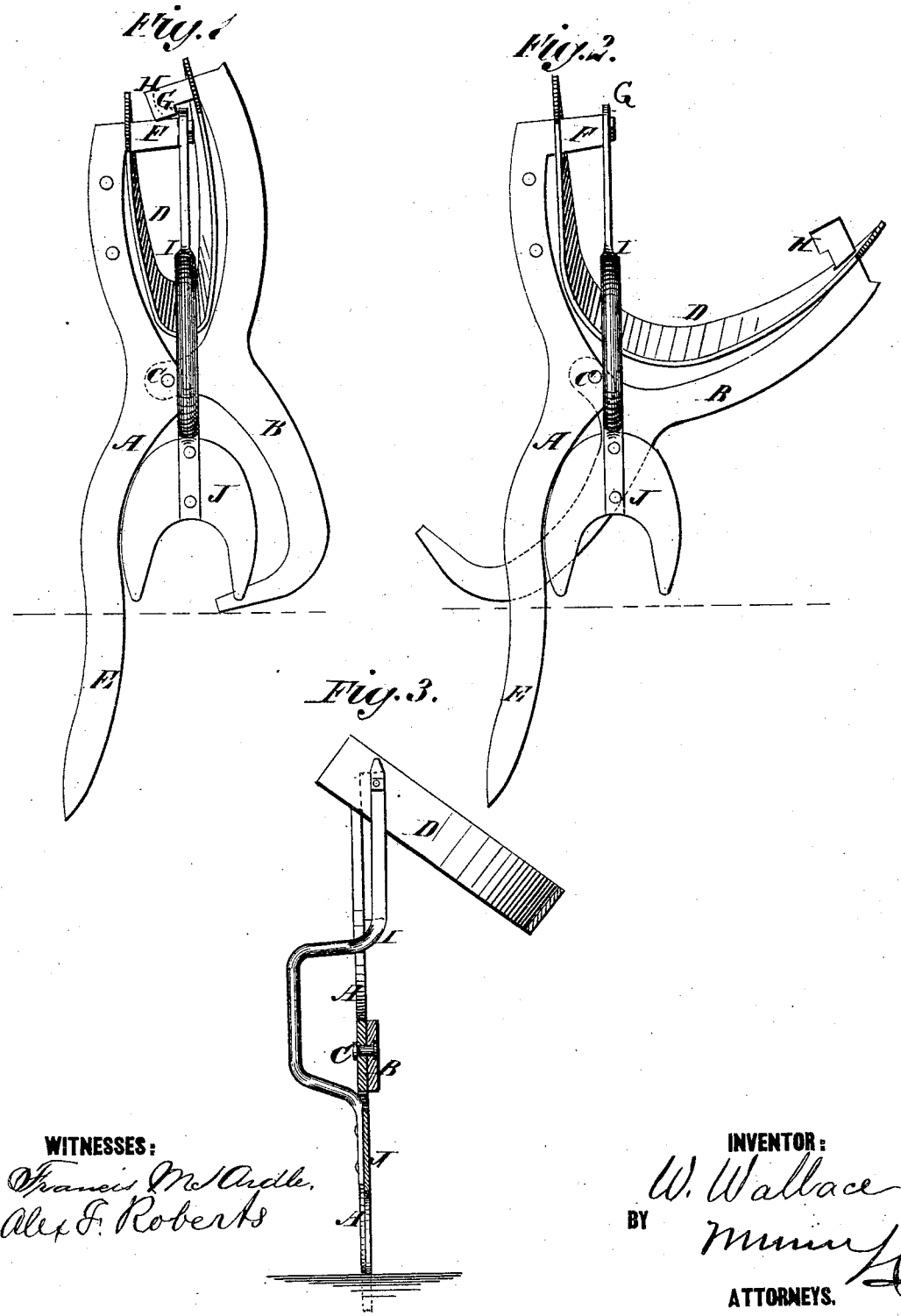

WILLIAM WALLACE, OF TARRYTOWN, NEW YORK.

IMPROVEMENT IN ANIMAL-TRAPS.

Specification forming part of Letters Patent No. 178,392, dated June 6, 1876; application filed November 13, 1875.

*To all whom it may concern:*

Be it known that I, WILLIAM WALLACE, of Tarrytown, in the county of Westchester and State of New York, have invented a new and Improved Mole-Trap, of which the following is a specification:

My invention consists of a stationary and a movable jaw, a spring, a trip, a catch, and a setting and tripping lever, the whole combined and arranged in such a manner as to provide a simple and efficient trap for catching moles and other burrowing animals, as will hereinafter more fully appear.

Figure 1 is a front elevation of my improved trap, showing it set. Fig. 2 is a front elevation, showing it sprung, and Fig. 3 is a sectional elevation.

Similar letters of reference indicate corresponding parts.

A is the stationary jaw, and B the movable one. They are pivoted together at C, and extend above the pivot a suitable distance to be closed quickly and forcibly by a strong spring, D. The jaw A has an extension, E, forming a stake, by which the trap may be set up in the ground.

At the upper end the jaw A has an arm, F, on which the trip G, for setting and springing the trap, is pivoted, and the other jaw has a catch, H, for hooking onto the trip for setting the trap.

I is a lever, on the upper end of which the trip is formed, and which extends downward to the point where the jaws are to gripe the animal, and carries the yoke J, to be set in the runway, so as to be moved by the animals in attempting to pass under it. By this lever attachment to the trip the trap is very sensitive and easy to spring, and is, therefore, more certain and efficient.

Having thus described my invention, I claim as new and desire to secure by Letters Patent—

The combination of the jaws A B, spring D, trip G, catch H, and lever I, substantially as specified.

WILLIAM WALLACE.

Witnesses:
 ADAM N. WINNER,
 MARTIN DUNN.